(12) United States Patent
Kim et al.

(10) Patent No.: US 8,812,906 B2
(45) Date of Patent: Aug. 19, 2014

(54) METHOD FOR SYSTEM RECOVERY AND APPARATUS SUPPORTING THE SAME

(75) Inventors: Hyung Chan Kim, Suwon-si (KR); Jong Rip Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 262 days.

(21) Appl. No.: 12/903,562

(22) Filed: Oct. 13, 2010

(65) Prior Publication Data

US 2011/0126044 A1 May 26, 2011

(30) Foreign Application Priority Data

Nov. 20, 2009 (KR) .................. 10-2009-0112436

(51) Int. Cl.
| | |
|---|---|
| *G06F 11/00* | (2006.01) |
| *G06F 11/14* | (2006.01) |
| *G06F 9/44* | (2006.01) |
| *G06F 9/445* | (2006.01) |

(52) U.S. Cl.
CPC .......... *G06F 11/1433* (2013.01); *G06F 9/4401* (2013.01); *G06F 8/63* (2013.01)
USPC ................................... 714/15; 714/36; 713/2

(58) Field of Classification Search
None
See application file for complete search history.

(56) References Cited

U.S. PATENT DOCUMENTS

| | | | | |
|---|---|---|---|---|
| 6,473,857 | B1 * | 10/2002 | Panas et al. | 713/2 |
| 7,206,971 | B2 * | 4/2007 | Zeller et al. | 714/36 |
| 7,730,355 | B2 * | 6/2010 | Maity et al. | 714/36 |
| 7,822,963 | B2 * | 10/2010 | Willems | 713/2 |
| 7,886,190 | B2 * | 2/2011 | Rothman et al. | 714/36 |
| 2002/0099971 | A1 * | 7/2002 | Merkin et al. | 714/6 |
| 2003/0074549 | A1 * | 4/2003 | Paul et al. | 713/2 |
| 2004/0199825 | A1 * | 10/2004 | Zeller et al. | 714/36 |
| 2007/0192466 | A1 * | 8/2007 | Nahum | 709/223 |
| 2013/0047031 | A1 * | 2/2013 | Tabone et al. | 714/15 |

FOREIGN PATENT DOCUMENTS

| | | |
|---|---|---|
| KR | 10-2004-0051123 A | 6/2004 |
| KR | 10-2007-0044268 A | 4/2007 |

* cited by examiner

*Primary Examiner* — Christopher McCarthy
(74) *Attorney, Agent, or Firm* — Sughrue Mion, PLLC

(57) ABSTRACT

A system recovery method and an apparatus supporting the same are disclosed. A software image is downloaded, and a system is loaded with the downloaded software image, and the system is recovered by a software image used before the updating, if the system loading fails.

22 Claims, 4 Drawing Sheets

METHOD FOR SYSTEM RECOVERY AND APPARATUS SUPPORTING THE SAME

CROSS-REFERENCE TO RELATED APPLICATION

This application claims priority from Korean Patent Application No. 10-2009-0112436, filed on Nov. 20, 2009, the disclosure of which is incorporated herein in its entirety by reference.

BACKGROUND

1. Field

Methods and apparatuses consistent with exemplary embodiments relate to automatically recovering a system by dynamic image loading, when system loading fails.

2. Description of the Related Art

A variety of embedded system products such as a digital camera, a personal digital assistant (PDA), a mobile phone, a Motion Picture Experts Group-1 Audio Layer 3 (MP3) player, a blood tester, etc. store software programs to load their operation systems in the form of images in internal storages like non-volatile memories or a hard disk drive (HDD). For function expansion or testing, these embedded system products offer a real-time update function of downloading software images from an update server periodically or upon release of a new version, and storing the downloaded images in internal storages. However, because a software image directly affects system operation, downloading a wrong software image in a system may cause a fatal error that the system is not even booted. Even with a normal downloaded software image, a possible error of the software image caused by a physical or electrical impact may also cause a fatal error like non-booting of the system.

Therefore, a method has been proposed in which an original software image is separately stored in its internal storage, and when some problem occurs to the software image, the original software image is retrieved. However, this method requires system recovery through switch manipulation, thereby making it difficult for a user to recover the system.

SUMMARY

One or more exemplary embodiments provide a method to automatically recover a system by dynamic image loading, when an error occurs to the system due to a software image, and an apparatus supporting the same.

One or more exemplary embodiments also provide a method to recover a system such that a user may select a software image of a version suited for a purpose by dynamic software image selection, and an apparatus supporting the same.

In accordance with an aspect of an exemplary embodiment, a system recovery method includes downloading a first software image, loading a system with the first software image, and recovering the system by a second software image used before the updating, if the loading the system with the first software image fails.

The system recovery method may further include storing the first software image in a first storage area among a plurality of storage areas, and setting a loading area, which stores a software image to be loaded on the system, to the first storage area. The system may be loaded with the first software image stored in the first storage area.

Software images of different versions may be stored in the plurality of storage areas.

The plurality of storage areas may be a plurality of physically or logically multiplexed storage media.

The plurality of physically multiplexed storage media may include hard disks or flash memories.

The plurality of logically multiplexed storage media may include logical partitions defined in each of physical storage media.

The system loading failure may be determined using a watchdog timer. The system recovery method may further include determining a failure of the loading the system If the loading the system with the first software image fails, for the system recovery, the loading area may be changed to a second storage area which stores the second software image, and the system may be loaded with the second software image stored in the changed loading area.

The changed loading area may be a loading area used before the downloading the first software image.

In accordance with an aspect of another exemplary embodiment, a system recovery method includes booting a system using a software image stored in a loading area while the system is being used, and if the booting the system fails, changing the loading area to another storage area and rebooting the system.

The loading area may be one of a plurality of storage areas, to be loaded during the system booting.

The system may be rebooted using a software image stored in the changed loading area.

In accordance with an aspect of another exemplary embodiment, a system recovery method includes determining whether it is time to boot a system, selecting a first software image to be loaded among a plurality of software images, if it is time to boot the system, booting the system using the first software image, at a first time, and booting the system using a second software, at a second time.

In accordance with an aspect of another exemplary embodiment, an apparatus for supporting system recovery includes a plurality of storages which store a plurality of software images, respectively, and a boot loader which selects as a loading area a first storage area storing a first software image, among the plurality of storage areas, loads a system with the first software image, and, if the loading the system with the first software image fails, changes the loading area to a second storage area among the plurality of storage areas to recover the system with a second software image stored in the second storage area.

The system recovery supporting apparatus may further include a watchdog timer which determines whether the loading the system loading fails.

In accordance with an aspect of another exemplary embodiment, a plurality of storages which store a plurality of software images, respectively, and a boot loader which selects as a first storage area as a loading area storing a first software image, from among the plurality of storage areas to load a system with the first software image, at a first time, and changes the loading area to a second storage area storing a second software image among the plurality of storage areas to load the system with the second software image, at a second time.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
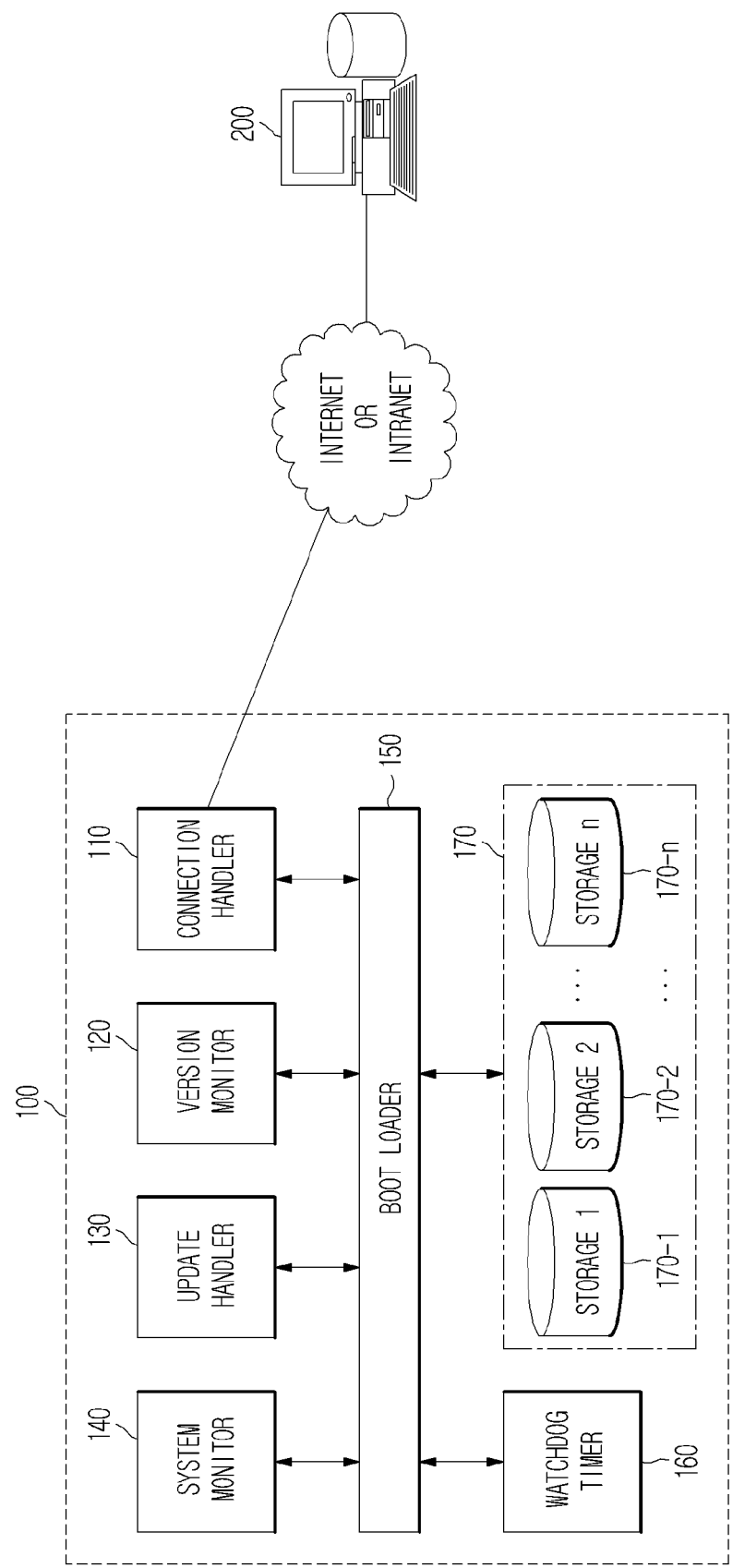
FIG. 1 is a block diagram of an apparatus to support system recovery according to an exemplary embodiment.

Exemplary embodiments will now be described in detail with reference to the accompanying drawings, wherein like reference numerals refer to like elements throughout.

FIG. 1 is a block diagram of an apparatus to support system recovery, particularly a block diagram of an apparatus to support real-time update, and, when system booting fails, to support automatic recovery with a previously used software image, according to an exemplary embodiment.

Referring to FIG. 1, a system recovery supporting apparatus 100 according to an exemplary embodiment includes a connection handler 110, a version monitor 120, an update handler 130, a system monitor 140, a boot loader 150, a watchdog timer 160, and storages 170. The system recovery supporting apparatus 100 communicates with an update server 200 through a network such as the Internet or an intranet.

The connection handler 110 manages a connection between the system recovery supporting apparatus 100 and the update server 200. The version monitor 120 may be a kind of daemon to monitor periodically whether the update server 200 has a software image of a new version.

The update handler 130 downloads a new software image from the update server 200 and stores the downloaded software image in one of storage areas 170-1 to 170-n multiplexed in the storages 170, when a new version is released. The system monitor 140 manages environment variables of the system. For example, the system monitor 140 changes a software image area storing a software image to be loaded to a storage area having the new software image, when the downloading is completed.

The boot loader 150 is a program module which is executed before an operation system is booted to complete all operation tasks needed for a normal kernel startup, for the booting of the operation system. The boot loader 150 forms an application execution environment through hardware initialization using a boot-up code. The boot-up code determines a storage or partition having a software image to be loaded into a random access memory (RAM) area, referring to booting environment variables such as those in Table 1 below.

TABLE 1

| Environment variables | Notes |
| --- | --- |
| Software image area information | The position of a software image to be loaded when booting |
| System loading failure information | This variable indicates whether the previous system loading has failed. |

Table 1 lists mandatory information that has to be set as booting environment variables. The software image area information indicates a storage area 170-1, 170-2, . . . or 170-n having a software image to be loaded. The system loading failure information is a flag indicating whether the previous system loading has failed. If the system loading failure flag is set, a software image stored in a storage area other than a current storage area is loaded and the software image area information is changed to the changed storage area.

The watchdog timer 160 reboots the system in hardware, unless a time value is updated or the timer is deactivated a predetermined time later.

The storages 170 may be a plurality of individual hard disks or flash memories as physical storage media or logical partitions in each of the physical storage media. A plurality of storage areas 170-1 to 170-n are multiplexed in the storages 170, wherein each storage area stores a different version of a software image.

Figure 2:
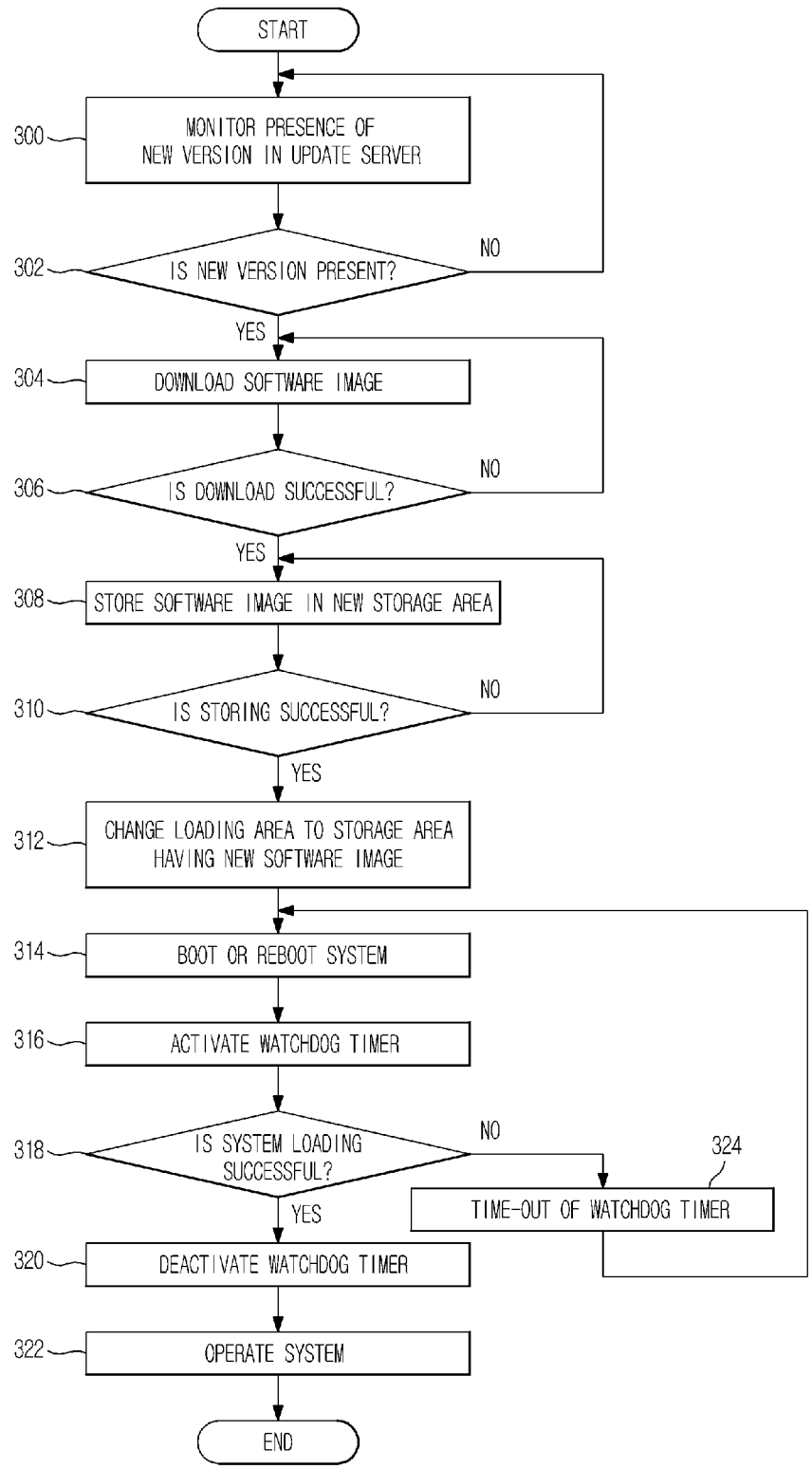
FIG. 2 is a flowchart illustrating a system recovery method to support real-time update and to automatically recover a system with a previous software image when system booting fails according to an exemplary embodiment.

FIG. 2 is a flowchart illustrating a system recovery method to support a real-time software image update, and, when system booting fails, to recover a system with a previous software image, according to an exemplary embodiment. After the update, it is determined whether system booting is normal. When the system operates abnormally, system rebooting is attempted using a software image stored in a previous booted area, thereby preventing a system failure.

Referring to FIG. 2, the update server 200 is queried about the latest version of a software image, and information about the latest version is received from the update server 200 (300).

The version monitor 120 monitors periodically whether the update server 200 has a new version of a software image by comparing the latest version of the software image in the server 200 with a current version of the software image stored in the storages 170 (302).

If it is determined that the latest version is not a new version (302—NO), the procedure returns to operation 300. If it is determined that the latest version is a new version (302—YES), the software image of the new version is downloaded from the update server 200 (304).

Next, it is determined whether the download is successful (306). In it is determined that the download is successful (306—YES), the downloaded software image is stored in one of the storage areas 170-1 to 170-n, other than a storage area having a previous software image (308).

It is determined whether the downloaded software image has been successfully stored in the storage area (310). If it is determined that storing of the software image storing successfully completed (310—YES), the software image area information listed in Table 1 is set to the storage area in which the new software image is stored (312) so that the new software image in the storage area is loaded into the RAM area during booting the system (314).

During system booting, the boot loader 150 attempts system loading by reading the new software image, referring to the booting environment variables in Table 1. Information about the previous system loading failure is also stored as a booting environment variable. Accordingly, if the system loading failure flag is set, the boot loader 150 attempts system loading by reading a software image from another storage area in operation 314.

The watchdog timer 160 is set to a predetermined timer value (316), and it is determined whether the system loading with the new software image is successful (318).

If it is determined that the system loading with the new software image is successful (318—YES), the watchdog timer 160 is deactivated (320), and the system is operated (322).

On the other hand, if the system loading with the new software image fails due to a defect in the new software image or any other factor (318—NO), the watchdog timer 160 is timed out (324), and the system is rebooted (314). During the system rebooting, the boot loader 150 attempts system loading by reading a previously loaded software image stored in a storage area, referring to the system loading failure flag. Thus when the system loading of the new software image fails, the system may be automatically recovered using the previous software image.

Figure 3:
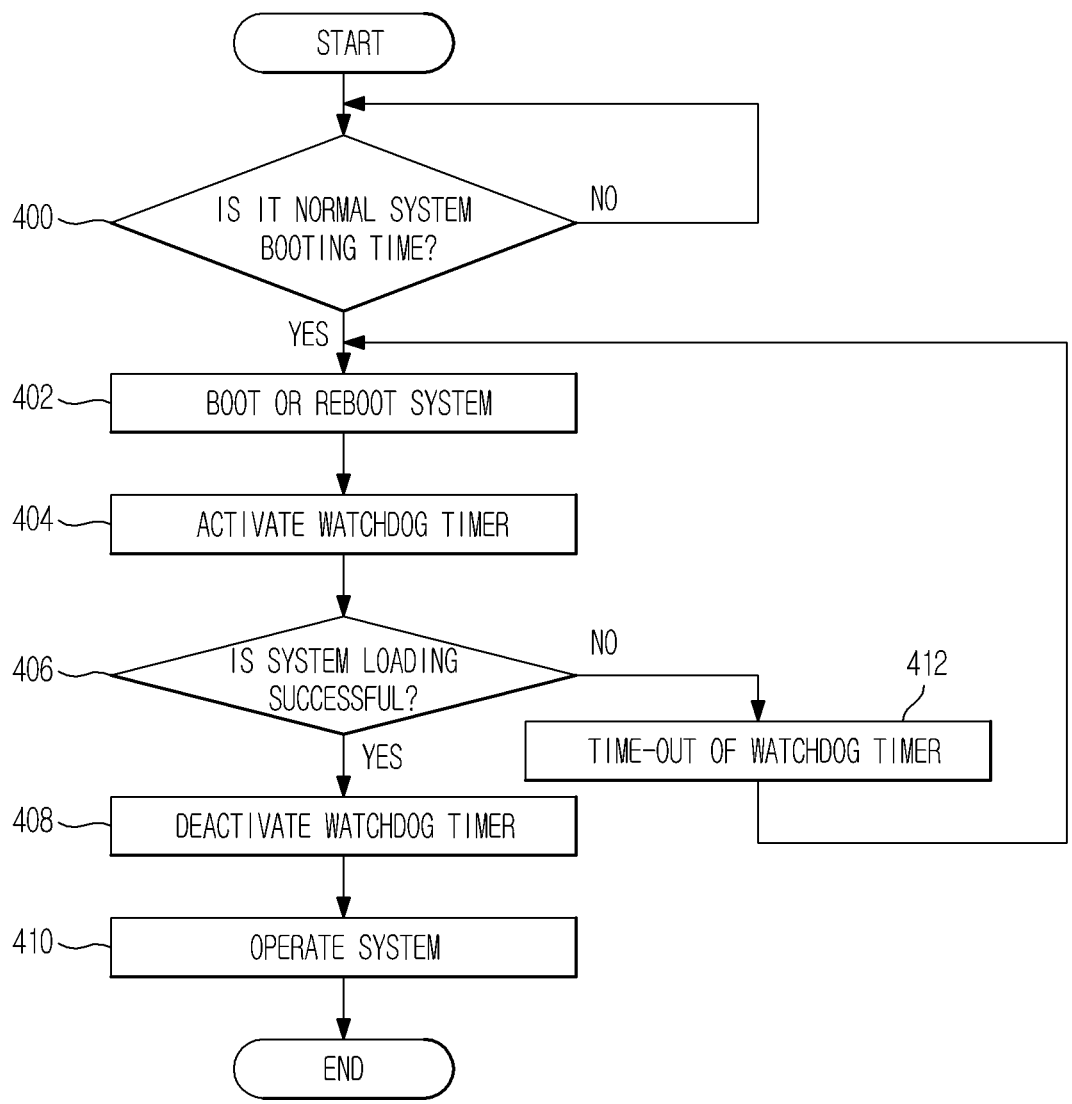
FIG. 3 is a flowchart illustrating a system recovery method to recover a system when a software image is damaged during a normal system operation according to another exemplary embodiment.

FIG. 3 is a flowchart illustrating a system recovery method to automatically recover a system, when a software image is damaged during a normal operation according to another exemplary embodiment. This method is about attempting system loading by reading a software image from another storage area, referring to the system loading failure information during a general system booting, which is not a situation in FIG. 2 where the system is booted after a real-time software image update.

Referring to FIG. 3, it is determined whether it is time to boot the system normally while the system is being used (400). In case of a general system booting, a new software image stored in another storage area may be loaded into the RAM area, referring to the system loading failure information.

When the system is booted, the boot loader 150 attempts system loading by reading the new software image, referring to the booting environment variables listed in Table 1. The booting environment variables include a booting environment variable that provides information about the previous system loading failure. If the system loading failure flag is set, the boot loader 150 attempts system loading by reading a software image from another storage area (402).

The watchdog timer 160 is set to a predetermined timer value (404), and it is determined whether the system loading with the new software image is successful (406).

If it is determined that the system loading with the new software image is successful (406—YES), the watchdog timer 160 is deactivated (408), and the system is operated (410).

On the other hand, if it is determined that the system loading with the new software image fails due to a defect in the new software image or any other factor (406—NO), the watchdog timer 160 is timed out (412), and the system is rebooted (402). During the system rebooting, the boot loader 150 attempts system loading by reading a software image stored in another storage area, referring to the system loading failure flag. Thus, even though a software image is damaged in a physical storage medium due to a user's inadvertent use, a fatal system malfunction such as system breakdown does not occur as far as all of software images stored in all storage areas are not damaged.

Figure 4:
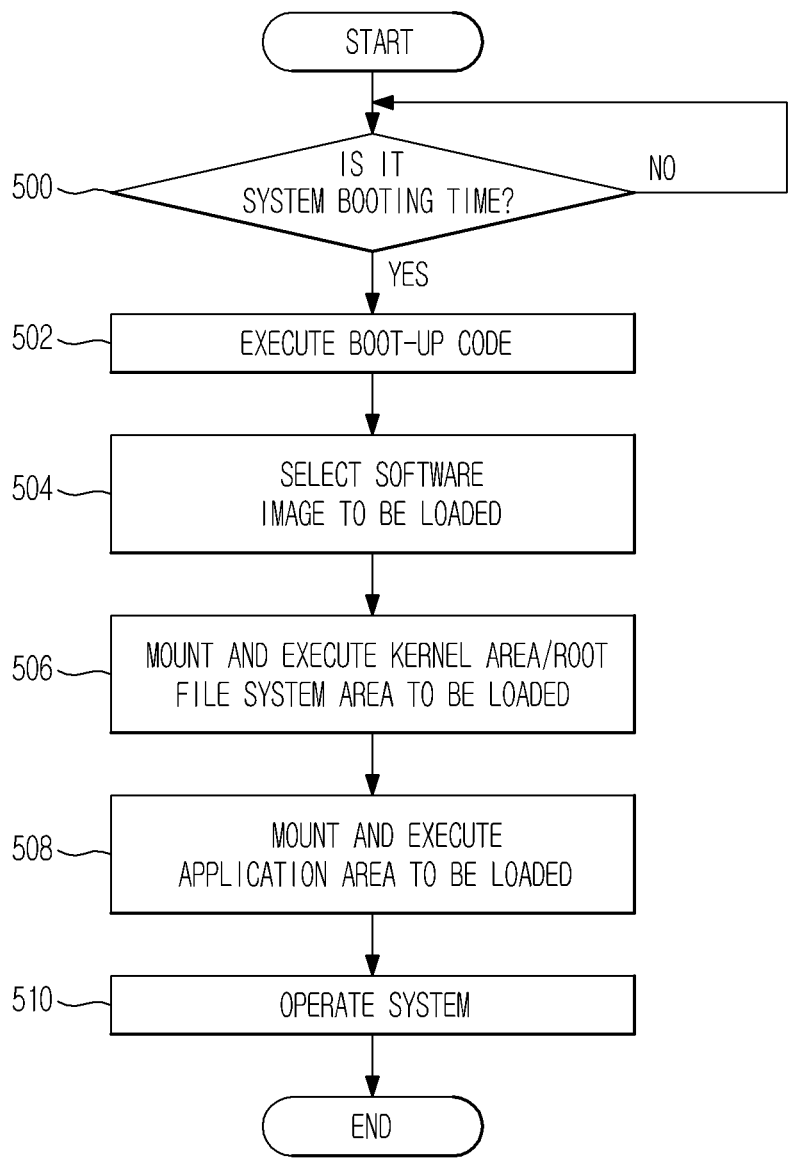
FIG. 4 is a flowchart illustrating a system recovery method to select a software image through dynamic multi-image loading according to a another exemplary embodiment.

FIG. 4 is a flowchart illustrating a system recovery method to select a software image by dynamic multi-image loading according to another exemplary embodiment. Each time system loading is performed, a software image is randomly selected to thereby attempt the system loading.

Referring to FIG. 4, it is determined whether it is time to boot the system (500). When it is time for system booting, the boot loader 150 executes a boot-up code (502), and selects a software image to be loaded by analyzing the booting environment variables listed in Table 1 (504).

The boot loader 150 mounts and executes a kernel area and a root file system area which are to be loaded before the operation system of the system is executed, thereby finishing all necessary operation tasks (506). Next, the boot loader 150 forms an operation environment by mounting and executing an application area to be loaded through hardware initialization (508).

Then, the system is operated (510). Thus, the user is allowed to load and execute a software image of a different version according to a purpose, thereby leading to a flexible use of the system.

As is apparent from the above descriptions, an improved system recovery method and an apparatus supporting the same prevent a fatal system error that may be caused by a mistake of a software developer or damage to a software image during using a system. If a fatal error occurs to a software image to be updated, a system panic phenomenon may be produced after the update. To boot the system with a software program stored in another area without complete breakdown of the system, a user is allowed to attempt an update by dynamic software image loading or the system is loaded with a soft image of a previous version. When a software image stored in a physical storage medium is damaged due to an inadvertent use of the user, the system is not down as far as all of the software images of all storage areas are not damaged. Also, system flexibility is increased through dynamic multi-image loading that enables the user to select a software image of a version suitable for the user's purpose.

Although a few exemplary embodiments have been shown and described, it would be appreciated by those skilled in the art that changes may be made in these exemplary embodiments without departing from the principles and spirit of the inventive concept, the scope of which is defined in the claims and their equivalents.

What is claimed is:

1. A system recovery method, comprising:
downloading a plurality of software images;
determining whether it is time to boot a system;
selecting a first software image to be loaded among the plurality of software images, if it is determined that it is time to boot the system;
loading the system with the first software image; and
recovering the system by a second software image used before the downloading, based on booting environmental variables of the first software image, if the loading the system with the first software image fails,
wherein the booting environmental variables includes system loading failure information indicating whether the first software image has previously failed.

2. The system recovery method according to claim 1, further comprising:
storing the first software image in a first storage area among a plurality of storage areas; and
setting a loading area, which stores a software image to be loaded on the system, to the first storage area,
wherein the loading the system comprises loading the system with the first software image stored in the first storage area.

3. The system recovery method according to claim 2, wherein at least one software images of a different version of a same software image, and is stored in a corresponding storage area among the plurality of storage areas, and
wherein the first and second software images are different versions of the same software image.

4. The system recovery method according to claim 3, further comprising determining a failure of the loading the system.

5. The system recovery method according to claim 4, further comprising changing the loading area to a second storage area which stores the second software image, if the loading the system with the first software image fails.

6. The system recovery method according to claim 5, wherein the second storage area is the loading area used before the downloading the first software image.

7. The system recovery method according to claim 2, wherein the plurality of storage areas are a plurality of physically or logically multiplexed storage media.

8. The system recovery method according to claim 7, wherein the plurality of physically multiplexed storage media comprise hard disks or flash memories.

9. The system recovery method according to claim 8, wherein the plurality of logically multiplexed storage media comprise logical partitions defined in each of physical storage media.

10. A system recovery method comprising:
determining whether it is time to boot a system;
booting the system using a software image stored in a loading area while the system is being used if it is determined that it is time to boot the system; and
if the booting the system fails, changing the loading area to another storage area based on booting environmental variables of the software image and rebooting the system,
wherein the booting environmental variables includes system loading failure information indicating whether the software image has previously failed.

11. The system recovery method according to claim 10, wherein the loading area is one of a plurality of storage areas, to be loaded during the booting the system.

12. The system recovery method according to claim 11, wherein different versions of the software image are stored in the plurality of storage areas.

13. The system recovery method according to claim 12, wherein the rebooting the system comprises booting the system using a different version of the software image stored in the changed loading area.

14. A system recovery method comprising:
determining whether it is time to boot a system;
selecting a first software image to be loaded among a plurality of software images, if it is determined that it is time to boot the system; and
booting the system using the first software image, at a first time, and
booting the system using a second software, at a second time,
wherein the first software image and the second software image are stored in first and second storage areas, which are set to a loading area, which is loaded for the booting the system, at the first time and second time, respectively,
wherein the loading area is changed to the second storage area storing the second software image based on booting environmental variables of the first software image, and
wherein the booting environmental variables includes system loading failure information indicating whether the first software image has previously failed.

15. The system recovery method of claim 14, wherein the second software image is a different version of the first software image.

16. An apparatus for supporting system recovery, comprising:
a plurality of storage areas which store a plurality of software images, respectively; and
a boot loader which selects as a loading area a first storage area storing a first software image, among the plurality of storage areas, loads a system with the first software image when it is a predetermined time to boot a system, and, if the loading the system with the first software image fails, changes the loading area to a second storage area among the plurality of storage areas to recover the system with a second software image stored in the second storage area,
wherein the boot loader changes the loading area to the second storage area storing the second software image based on booting environmental variables of the first software image, and
wherein the booting environmental variables includes system loading failure information indicating whether the first software image has previously failed.

17. The apparatus according to claim 16, further comprising a watchdog timer which determines whether the loading the system loading fails.

18. The apparatus according to claim 16, wherein the second software image is a different version of the first software image.

19. The apparatus according to claim 16, wherein the second software image is used for booting the system before the loading the system with the first software image.

20. An apparatus for supporting system recovery, comprising:
a plurality of storage areas which store a plurality of software images, respectively; and
a boot loader which, when it is a predetermined time to boot a system, selects as a first storage area as a loading area storing a first software image, from among the plurality of storage areas to load the system with the first software image, at a first time, and changes the loading area to a second storage area storing a second software image among the plurality of storage areas to load the system with the second software image, at a second time,
wherein the boot loader changes the loading area to the second storage area storing the second software image based on booting environmental variables of the first software image, and
wherein the booting environmental variables includes system loading failure information indicating whether the first software image has previously failed.

21. The apparatus according to claim 20, wherein the second software image is a different version of the first software image.

22. The apparatus according to claim 21, wherein the plurality of storage areas are a plurality of physically or logically multiplexed storage media.

* * * * *